Figure 1:
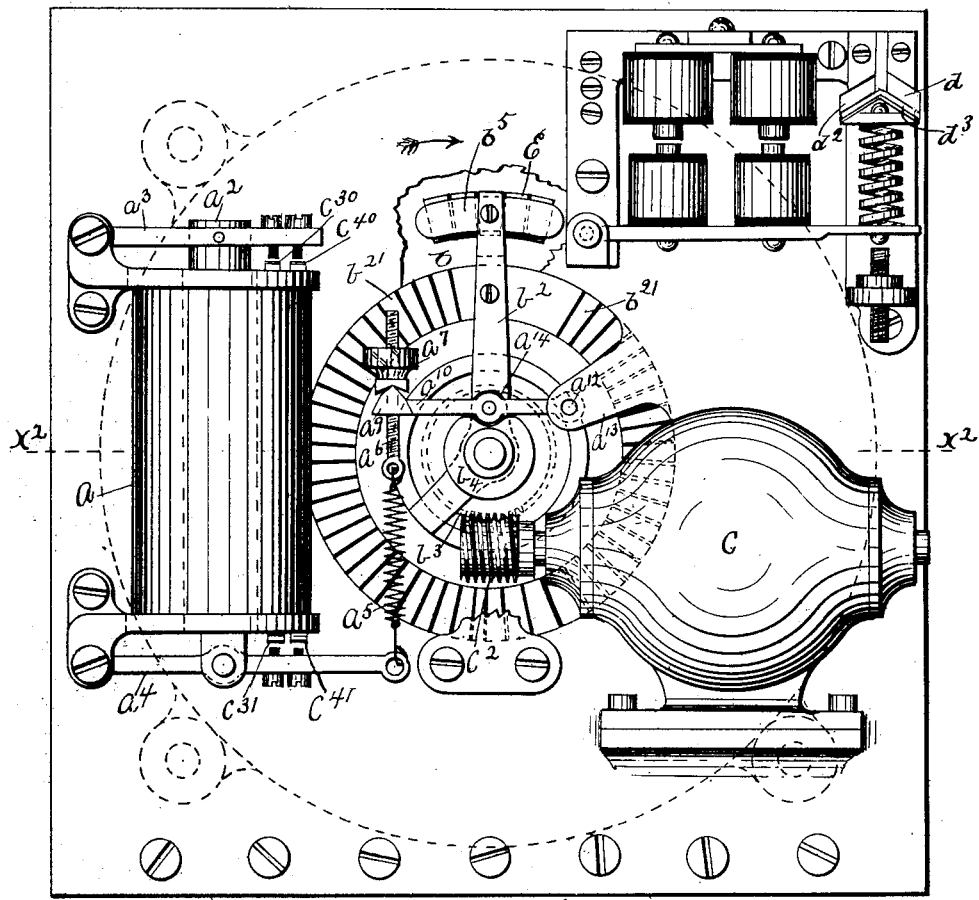

No. 660,396. Patented Oct. 23, 1900.
C. W. RICHARDS.
ELECTRIC REGULATOR.
(Application filed Aug. 21, 1899.)

(No Model.)  3 Sheets—Sheet 1.

WITNESSES.
Jas. J. Maloney.
A. E. McCabe.

INVENTOR.
Charles W. Richards
by J. P. and W. J. Livermore
Attys.

THE NORRIS PETERS CO., PHOTO-LITHO., WASHINGTON, D. C.

No. 660,396. Patented Oct. 23, 1900.
C. W. RICHARDS.
ELECTRIC REGULATOR.
(Application filed Aug. 21, 1899.)
(No Model.) 3 Sheets—Sheet 2.
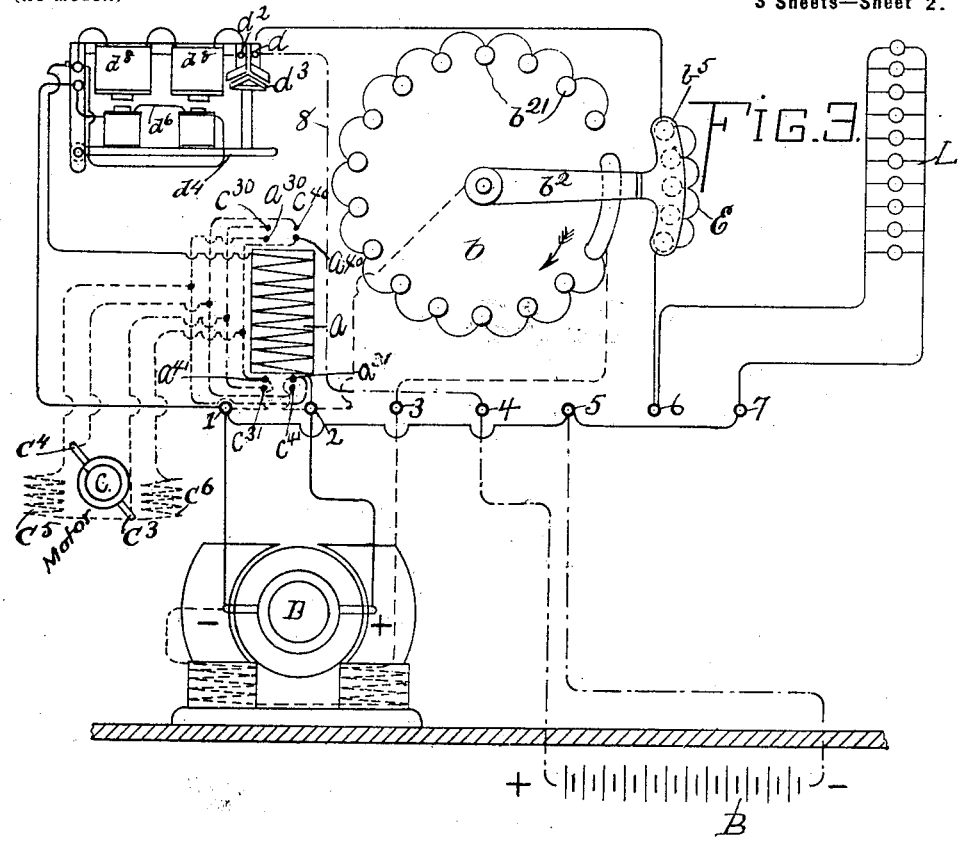
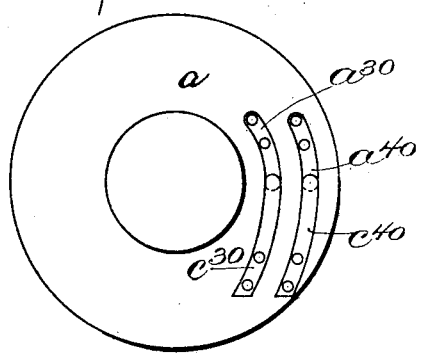
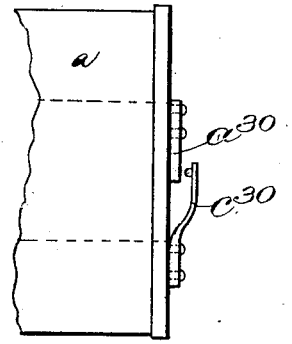
WITNESSES. INVENTOR.
Charles W. Richards

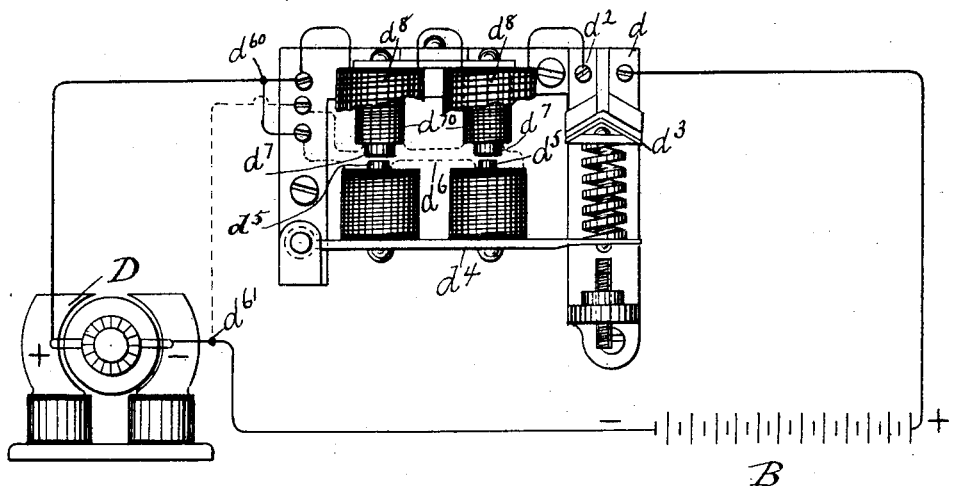

UNITED STATES PATENT OFFICE.

CHARLES W. RICHARDS, OF NEEDHAM, MASSACHUSETTS, ASSIGNOR OF ONE-HALF TO WINTHROP M. CHAPMAN, OF SAME PLACE.

ELECTRIC REGULATOR.

SPECIFICATION forming part of Letters Patent No. 660,396, dated October 23, 1900.

Application filed August 21, 1899. Serial No. 728,003. (No model.)

*To all whom it may concern:*

Be it known that I, CHARLES W. RICHARDS, a citizen of the United States, residing at Needham, in the county of Norfolk and State of Massachusetts, have invented an Improvement in Electric Regulators, of which the following description, in connection with the accompanying drawings, is a specification, like characters on the drawings representing like parts.

The present invention relates to a regulator for electric currents in cases where the dynamo is driven at variable speeds and is shown as embodied in a car-lighting system in which a dynamo driven by the car-axle is arranged to supply lamps and a storage battery, the storage battery constituting a reserve to keep the lamps supplied when the dynamo is not running. It is to be understood, however, that the regulator may be used in any system where the power used to drive the dynamo is of such a nature as to cause the dynamo to run at a variable speed.

The invention consists, mainly, in a novel construction and arrangement of the actuating devices for the rheostat which controls the current, whereby the system is simplified, it being obvious that the regulator may be used for other purposes, although shown for convenience in connection with a car-lighting system, for which it is especially designed.

In accordance with the invention a motor is geared directly to the movable member of a rheostat in the dynamo-circuit, the said motor being under the control of a solenoid, also in the dynamo-circuit, the core of which solenoid is arranged by its movement in one direction to connect the motor-terminals in such a way as to cause the motor to travel in one direction and by its movement in the other direction to so connect the motor-terminals as to cause the motor to travel in the opposite direction. The solenoid is normally balanced, so as to cut the motor out altogether.

A further feature of the invention consists in a magnetic switch-operating device for controlling the circuits in a car-lighting or other system, in which a storage battery is used in conjunction with a dynamo, the object of which is to cause the switch to open promptly when the magnets are deënergized, this being accomplished by overcoming the residual magnetism, which is liable to prevent the prompt opening of the switch and cause failure in the operation, as will be hereinafter described.

Figure 2:
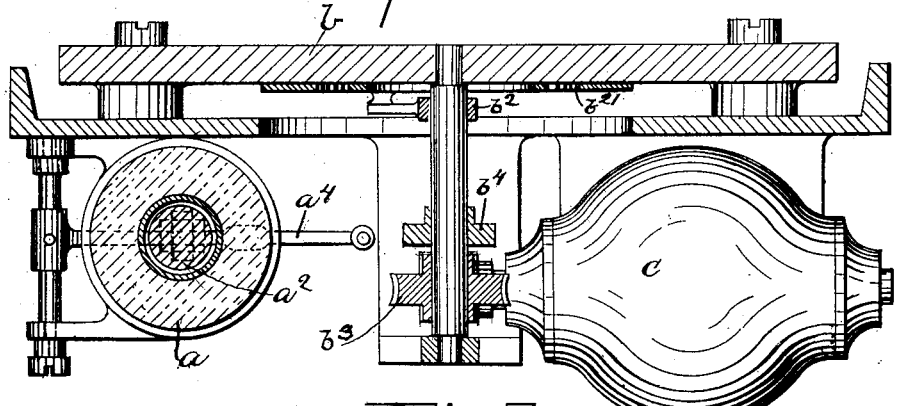

Figure 1 is a front elevation of a regulator embodying the invention, showing the mechanical construction, the circuit connections being omitted. Fig. 2 is a horizontal section of the same, taken mainly on the line $x^2$ of Fig. 1. Fig. 3 is a diagram of a car-lighting system, showing the circuit connections. Figs. 4 and 5 are details illustrating the circuit-closers for the rheostat-motor; Fig. 6, a diagram of the circuits of the magnets which control the switch, the other circuits being omitted for the sake of simplicity.

In accordance with the invention a solenoid $a$ is included in the circuit of the dynamo D, Fig. 3, the positive and negative terminals of which are indicated at 2 and 1, respectively, and said solenoid is provided with the usual core $a^2$, shown as connected with pivotally-supported arms $a^3$ and $a^4$, the former carrying a pair of studs adapted to act on contact-pieces $c^{30}$ and $c^{40}$ and the latter a pair of studs adapted to act on contact-pieces $c^{31}$ and $c^{41}$. The said core is shown as held in its normal position, Fig. 1, by means of a spring $a^5$ and is adapted to be moved against the stress of said spring when the solenoid is sufficiently energized. As the speed of the dynamo D increases it is necessary in order to regulate the current to increase the field-resistance, as by means of the rheostat $b$, which is shown as provided with the traveling member $b^2$, adapted by its movement over the rheostat contact-joints $b^{21}$ to include or exclude the resistance-coils. The rheostat is primarily controlled by the solenoid $a$, and, as herein shown, the traveling member $b^2$ of the rheostat is operatively connected with the armature of a motor $c$, by which it is directly controlled, said armature being herein shown as provided with a worm $c^2$, coöperating with a worm-gear $b^3$, which is connected with the member $b^2$. If, therefore, the said motor is started in the right direction, it will cause the member $b^2$ to travel in the direction indicated by the arrow and gradually cut in resistance-coils. If the motor subsequently runs in the other direction, it will obviously restore said member to its initial position. In order, therefore, to operate the rheostat in response to the variation of current in the solenoid, the core of the solenoid is so arranged that its movement in one direction will cause the dynamo-current to traverse the motor armature and field in one direction, while the movement of said core in the opposite direction will first cut out the motor, and if the movement is continued will reverse the direction of the current in said armature and field. As herein shown, Fig. 1, the movement of the core $a^2$ against the stress of the spring $a^5$ causes the studs on the arm $a^3$ to engage the contact-pieces $c^{30}$ and $c^{40}$ and force them into contact with the contact-pieces $a^{30}$ and $a^{40}$, Figs. 4 and 5, thus connecting the armature and field windings of the motor with the dynamo in such a manner as to start the motor in the right direction to move the rheostat-arm and increase the resistance. The motor-circuits are indicated in diagram Fig. 3, the brush $c^3$ being connected with contacts $c^{30}$ and $c^{31}$ and the brush $c^4$ with contacts $c^{40}$ and $c^{41}$, while the positive terminal 2 of the dynamo and the field-terminal $c^5$ of motor $c$ are connected with contacts $a^{31}$ and $a^{30}$ and the negative terminal of dynamo D and field-terminal $c^6$ of motor $c$ with contacts $a^{41}$ and $a^{40}$. The movement of the solenoid-core above described connects the contact $a^{30}$ with the contact $c^{30}$ and the contact $a^{40}$ with the contact $c^{40}$, so that the motor is started. The reverse movement of the solenoid-core will disengage these contacts and if continued far enough will bring together the contacts $c^{41}$ and $a^{31}$ and the contacts $c^{31}$ and $a^{41}$, thus reversing the motor, as will be readily seen by tracing the circuits in Fig. 3. As the dynamo starts, therefore, and the electromotive force increases the solenoid will become energized, and as soon as the tension of the spring $a^5$ is overcome sufficiently to permit the engagement of the contacts $c^{30}$ and $a^{30}$ and $a^{40}$ and $c^{40}$ the motor $c$ will start and the rheostat-arm $b^2$ will begin to travel in the direction of the arrow, introducing resistance into the dynamo field-circuit.

It is necessary that the solenoid-core should be practically balanced when there is no current flowing through the solenoid, and the spring tension is therefore adjusted to such a degree as to normally sustain only the weight of the core and keep it in a neutral position with the motor cut out. It is further desirable, however, that the core should be balanced when current is flowing through the solenoid to the desired extent in order that the motor may be again cut out, leaving the rheostat-arm in the proper position until further regulation is required. To this end the spring $a^5$ is provided with means whereby its tension is increased in response to the operation of the motor. As herein shown, the spring $a^5$ is connected with an adjusting-screw $a^6$, provided with an adjusting-nut $a^7$, having an edged bearing on a V-shaped projection $a^9$, shown as formed on an arm $a^{10}$, pivotally supported at $a^{12}$ upon a suitable supporting member $a^{13}$. The tension of the spring $a^5$ can thus be adjusted to the proper degree to cause the solenoid to start the motor at the proper time, as hereinbefore described.

In order to increase the tension of the spring $a^5$ after the motor has started, the arm $a^{10}$ is shown as provided with a cam-roll $a^{11}$, arranged to be acted upon by a cam $b^4$, which is arranged to travel with the rheostat-arm $b^2$. The rheostat-arm is caused to travel in response to the operation of the motor, and the arm $a^{10}$ will be moved by the cam and will thereby increase the tension of the spring $a^5$, so that a greater resistance is opposed to the movement of the solenoid-core $a^2$ than that of the original tension of the said spring, the cam being so adjusted as to cause the spring, after its tension is thus increased, to practically balance the weight of the core, plus the action of the solenoid thereon, when the line-current is properly regulated. If, therefore, the electromotive force continues to increase, the motor $c$ will continue to operate, introducing more and more coils of the rheostat into the dynamo field-circuit; but as soon as such increase of the electromotive force ceases it is obvious that the increased tension of the spring $a^5$ will balance the attractive effect of the solenoid, as well as the weight of the core, so as to permit separation of the contacts $a^{30}$ and $a^{40}$ from the contacts $c^{30}$ and $c^{40}$, thus cutting out the motor and preventing a further movement of the rheostat-arm. If the speed of the dynamo decreases, thus further reducing the electromotive force, it is obvious that the increased tension of the spring will produce a movement of the solenoid-core beyond its normal balanced position, so as to bring together the contacts $a^{41}$ and $c^{31}$ and $a^{31}$ and $c^{41}$, and thereby cause the motor to run in the opposite direction and to gradually cut out the resistance-coils of the rheostat. As the dynamo slows down, therefore, it will be seen that the motor $c$, running in the opposite direction, will restore the rheostat-arm $b^2$ to its normal position, allowing the arm $a^{10}$ to also resume its normal position, thus reducing the tension of the spring, it being obvious that this will not take place until the speed of the dynamo is reduced sufficiently to practically annul the attractive effect of the solenoid-core. The solenoid-core will then be restored to its normal balanced condition, with the motor entirely out of circuit.

From the foregoing description it will be seen that the rheostat is directly controlled in response to changes in current strength in the solenoid without the intervention of mechanical actuating devices other than the connecting mechanism by which the rheostat-arm is caused to be operated by the motor, as has been hereinbefore stated.

The invention is shown as applied to a lighting system where the power used to drive the dynamo is irregular or intermittent in speed, as is the case in a car-lighting system, where the dynamo is driven from a car-axle, or in a system for lighting or other purposes in which a dynamo is driven by a windmill or analogous intermittent or variable power source. In such systems it is customary to use a storage battery to provide a source of current when the dynamo is not operating and to cause the dynamo when in operation to store such battery, as well as to supply the lights or other translating devices, so as to have a supply of current always in readiness to perform the desired operations. Such a system is shown in diagram Fig. 3, in which the light-circuit L is shown as having the positive and negative terminals 6 and 7, respectively, the battery B as having the positive and negative terminals 4 and 5, respectively, while the dynamo has the positive and negative terminals 2 and 1, which have already been referred to, its field being connected with the positive terminal 3 and through the armature with the negative terminal 1. The translating devices or lamps L are shown as permanently in circuit with the battery B, the positive terminal 6 of the lamp-circuit and the positive terminal of the battery being connected with a switch member $d$, the mate $d^2$ of said switch member being connected with the positive brush of the dynamo, as shown in Fig. 3. The system is so arranged that when the dynamo has begun to generate sufficient current the current therefrom will be divided between the lights and battery, so as to supply both, and to this end the switch members $d$ and $d^2$ are arranged to be bridged by a member $d^3$, which operates when the electromotive force of the dynamo practically equals that of the battery. In systems of this kind as heretofore arranged the switch has been operated by means of electromagnets, the poles of which alternately operate as armatures. The fixed and movable members of the switch have each been provided with pole-pieces and windings, one winding of comparatively high resistance being permanently connected in the dynamo-circuit, and the other winding, which is on the other set of pole-pieces, being of comparatively low resistance and included in the circuit which connects the dynamo and the battery, so that said winding will be energized only when the circuit-closer is closed. In the operation of the switch the high-resistance coils become energized when the dynamo starts and are so arranged as to become sufficiently energized to attract the other pole-pieces when the dynamo has reached a predetermined speed, and thereby close the switch. As soon as the switch is closed the low-resistance coils become energized and the current through the high-resistance coils is practically shunted, so that the switch is held closed by the action of the low-resistance coils. Difficulty has been encountered, however, in this construction, owing to the fact that as the dynamo decreases in speed until its electromotive force practically equals that of the battery (at which time the circuit-closer should be opened) the members of said circuit-closer are held together by residual magnetism long enough to permit the battery-current to flow back through the low-resistance coils, thus keeping the switch closed, the path of low resistance being through the commutator and armature of the dynamo, so that the high-resistance coils do not take current enough to be sufficiently polarized to repel. This difficulty is obviated in accordance with the present invention by providing the cores of the low-resistance coils with a supplemental winding in series with that of the high-resistance coils, but in the opposite direction, the said winding not being of sufficient strength to prevent the operation of the main high-resistance coils, but merely to neutralize the residual magnetism.

As shown in Fig. 6, the member $d^3$ of the circuit-closer, which is adapted to bridge the contacts $d$ and $d^2$, is mounted on a pivotally-supported arm $d^4$, provided with magnet-cores $d^5$, upon which is wound a conductor $d^6$, (shown in dotted lines,) the said conductor having the positive and negative terminals $d^{60}$ and $d^{61}$, which connect with the dynamo. The pole-pieces $d^5$ are arranged adjacent to pole-pieces $d^7$, which practically constitute an armature for said pole-pieces $d^5$, so that as soon as the electromotive force of the dynamo is sufficient to energize the coils around the cores $d^5$ the arm $d^4$ will be moved upward, bringing the member $d^3$ into contact with the members $d$ and $d^2$ and closing the circuit through the dynamo and battery, as indicated in Fig. 6. This will obviously shunt the conductor $d^6$, so that the main portion of the current will travel through the low-resistance conductor of the main circuit, and in order to keep the circuit-closer closed the cores $d^7$ are provided with windings $d^8$ in series with the main circuit, so that the said cores become energized and attract the cores $d^5$ as soon as the main circuit is closed.

As the speed of the dynamo decreases until its electromotive force is practically balanced by that of the battery, it is obvious that the coils $d^8$ will cease to be energized and should allow the arm $d^4$ to drop and open the circuit. It has been found, however, in practice that when the coils before described are depended upon alone to operate the switch the residual magnetism will keep the switch members in contact until the battery-circuit itself has energized the low-resistance coils, the shunt-circuit through the high-resistance coils taking very little of the current, because the main line is short-circuited through the dynamo-armature. To obviate this difficulty and insure that the circuit-closer will open promptly, the cores $d^7$ in accordance with the present invention are provided with an auxiliary winding $d^{70}$ in series with the winding on the cores $d^5$, but wound in the opposite direction, so as to create the same polarity in the cores $d^7$ as that which is created in the opposite cores $d^5$ in response to the dynamo-current. As shown, the winding $d^{70}$ has fewer turns than the winding on the poles $d^5$, so that it does not prevent the said cores $d^5$ from being attracted when energized, so as to initially close the switch, although the said auxiliary winding does effectively prevent any residual megnetism. As soon, therefore, as the winding $d^8$ becomes neutralized or deënergized the arm $d^4$ will drop promptly and open the circuit-closer.

A further feature of the invention consists in the arrangement of the lamp-circuit resistance, which has to be included in the lamp-circuit when the dynamo is in operation to prevent the lamps from being burned out, since the lamps are arranged to take only the electromotive force of the battery-discharge, which is less than the electromotive force of the dynamo required to charge said battery. As herein shown, the lamp-circuit resistance E is shown as normally short-circuited by means of a contact-piece $b^5$, carried by the rheostat-arm $b^2$, and the solenoid-spring is so adjusted that it will cause the operation of the motor $c$, as hereinbefore described, as soon as the dynamo-current practically balances that of the battery, so that the first movement of said motor causes the contact-piece $b^5$ to travel along the contact-pieces of the lamp-circuit resistance E, gradually cutting resistance into the circuit as the speed of the dynamo increases. Thus the first operation of the said motor gradually cuts in the lamp-circuit resistance, and as soon as the said lamp-circuit resistance is wholly included, or, in other words, when the electromotive force of the dynamo is equal to the electromotive force needed to supply the lights and charge the battery, the continued movement of the rheostat-arm cuts in the field-resistance in order to properly regulate the output of the dynamo. By this arrangement the lamp-circuit is properly regulated, so that the said lamps will burn steadily during that interval of time when the electromotive force of the dynamo is increasing from its equality with that of the battery to its normal predetermined amount.

I claim—

1. In a regulator for electric currents, a solenoid in the circuit of the current to be regulated; two circuit-controllers; a spring whereby the solenoid-core is normally balanced between said circuit-controllers and adapted to operate one of said circuit controllers when the tension of the spring is overcome by the attractive force of the current flowing through the solenoid; a motor controlled by said circuit-controllers; a rheostat operated by said motor; and a device for increasing the tension of said spring, said device being connected with and operated by said rheostat, as set forth.

2. In a regulator for electric currents, an electrically-operated governor traversed and controlled by the current to be regulated; two sets of contact-pieces and a movable member for said governor balanced between said sets of contact-pieces when the governor is not electrically energized; and means for also so balancing said movable member when said governor is traversed by a predetermined current.

3. In a regulator for electric currents, a solenoid having its core provided with a spring whereby said core is normally balanced in a position between two circuit-closers, said solenoid being traversed by the current which is to be regulated, a motor adapted to be started in one direction by the action of one of said circuit-closers and in the other direction by the action of the other, a rheostat operated by said motor, and means for increasing the tension of the solenoid-core spring in response to the initial movement of the rheostat, as set forth.

4. The combination with a storage battery, of a dynamo, a circuit-closer to connect said dynamo with said battery, a switch member provided with electromagnets in circuit with the dynamo, a second switch member provided with other electromagnets in the circuit controlled by said circuit-closer, and a coil in series with said first electromagnet but oppositely wound, said coil surrounding the pole-pieces of said second electromagnet, as and for the purpose described.

In testimony whereof I have signed my name to this specification in the presence of two subscribing witnesses.

CHARLES W. RICHARDS.

Witnesses:
HENRY J. LIVERMORE,
JAS. J. MALONEY.